(12) United States Patent
Krassinger et al.

(10) Patent No.: US 7,587,931 B2
(45) Date of Patent: Sep. 15, 2009

(54) APPARATUS AND METHOD FOR TESTING FUEL FLOW

(75) Inventors: Eric Daniel Krassinger, Brentwood, MO (US); David Mark Allen, St. Louis, MO (US)

(73) Assignee: Lincoln Industrial Corporation, St. Louis, MO (US)

( * ) Notice: Subject to any disclaimer, the term of this patent is extended or adjusted under 35 U.S.C. 154(b) by 0 days.

(21) Appl. No.: 12/021,807

(22) Filed: Jan. 29, 2008

(65) Prior Publication Data

US 2009/0188308 A1 Jul. 30, 2009

(51) Int. Cl.
*G01M 15/04* (2006.01)

(52) U.S. Cl. .................................... 73/114.42

(58) Field of Classification Search .............. 73/114.38, 73/114.41, 114.42, 114.43, 114.45, 114.48, 73/114.51, 114.52
See application file for complete search history.

(56) References Cited

U.S. PATENT DOCUMENTS

| | | | |
|---|---|---|---|
| 2,064,148 A | 12/1936 | Brelsford |
| 2,311,375 A | 2/1943 | Farwick |
| 2,439,614 A | 4/1948 | Schramm |
| 2,720,782 A | 10/1955 | Stein |
| 2,859,611 A | 11/1958 | Morse |
| 3,177,707 A | 4/1965 | Whyte |
| 3,245,254 A | 4/1966 | Mayer |
| 3,292,428 A | 12/1966 | Motl |
| 3,745,818 A | 7/1973 | Gaenzler |
| 4,304,125 A | 12/1981 | Newman |
| 4,381,668 A | 5/1983 | Sato |
| 4,483,186 A | 11/1984 | Parel |
| 4,788,858 A | 12/1988 | Liebermann |
| 4,887,577 A | 12/1989 | Arai |
| 5,020,362 A | 6/1991 | Hart |
| 5,284,120 A | 2/1994 | Fukushima |
| 5,445,018 A | 8/1995 | Harpster |
| 5,633,457 A | 5/1997 | Kilar |
| 6,107,936 A | 8/2000 | Zimmerman |
| 6,457,353 B1 | 10/2002 | Kanke |
| 6,513,371 B1 | 2/2003 | Jett |
| 6,672,147 B1 | 1/2004 | Mazet |
| 6,675,641 B2 | 1/2004 | Gehner |

(Continued)

FOREIGN PATENT DOCUMENTS

GB 1168195 10/1969

*Primary Examiner*—Eric S McCall
(74) *Attorney, Agent, or Firm*—Senniger Powers LLP

(57) ABSTRACT

Apparatus and method for testing fuel flow in a return or returnless fuel system. The apparatus comprises a primary flow passage having an inlet for connection to the fuel system for receiving fuel pumped by the fuel pump, and an outlet adapted for connection to the fuel system for flow of fuel to one or more fuel injectors. The apparatus includes a first device for measuring a rate of fuel flow through the primary flow passage, and a second device for measuring a fuel pressure in the primary flow passage. A bypass valve in the primary flow passage is movable between a first position in which the bypass passage is closed and a second position in which the bypass passage is open. The bypass valve is movable to its first position for testing fuel flow in a return flow system and to its second position for testing fuel flow in a returnless fuel flow system. Different embodiments of the apparatus and methods of using the apparatus are disclosed.

20 Claims, 20 Drawing Sheets

U.S. PATENT DOCUMENTS

| | | |
|---|---|---|
| 6,679,230 B2 | 1/2004 | Kanai |
| 6,755,210 B2 | 6/2004 | Suzuki |
| 6,769,419 B2 | 8/2004 | Kanai |
| 6,796,173 B1 | 9/2004 | Lajoie |
| 6,966,218 B2 | 11/2005 | Oki |
| 6,971,375 B2 | 12/2005 | Amano |
| 7,178,510 B2 | 2/2007 | Askew |
| 7,197,918 B2 | 4/2007 | Shen |
| 7,228,729 B1 | 6/2007 | Krassinger |
| 7,231,816 B2 | 6/2007 | Christian |

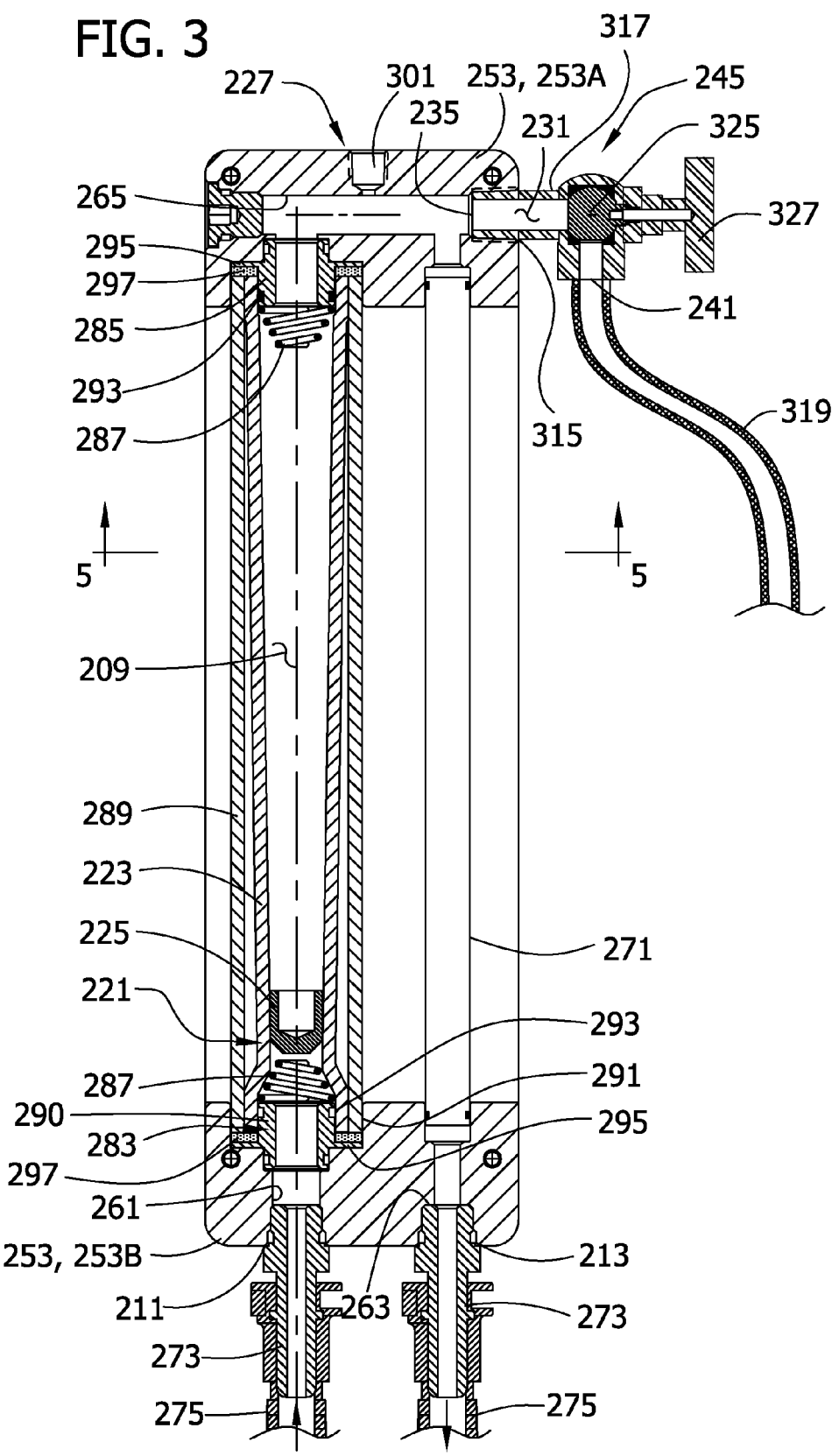

FIG. 12

Appendix A

Maximum Engine Fuel Volume Requirements
(Gallons/Minute)

| Engine Size | | Engine Speed (RPM) | | | | | |
|---|---|---|---|---|---|---|---|
| liters | CID | 3000 | 4000 | 5000 | 6000 | 7000 | 8000 |
| 1.0 | 61 | 0.05 | 0.06 | 0.07 | 0.09 | 0.10 | 0.12 |
| 1.2 | 73 | 0.06 | 0.07 | 0.09 | 0.11 | 0.12 | 0.14 |
| 1.4 | 85 | 0.06 | 0.08 | 0.10 | 0.12 | 0.15 | 0.17 |
| 1.6 | 98 | 0.07 | 0.10 | 0.12 | 0.14 | 0.17 | 0.19 |
| 1.8 | 110 | 0.08 | 0.11 | 0.13 | 0.16 | 0.19 | 0.21 |
| 2.0 | 122 | 0.09 | 0.12 | 0.15 | 0.18 | 0.21 | 0.24 |
| 2.2 | 134 | 0.10 | 0.13 | 0.16 | 0.20 | 0.23 | 0.26 |
| 2.4 | 146 | 0.11 | 0.14 | 0.18 | 0.21 | 0.25 | 0.29 |
| 2.6 | 159 | 0.12 | 0.15 | 0.19 | 0.23 | 0.27 | 0.31 |
| 2.8 | 171 | 0.12 | 0.17 | 0.21 | 0.25 | 0.29 | 0.33 |
| 3.0 | 183 | 0.13 | 0.18 | 0.22 | 0.27 | 0.31 | 0.36 |
| 3.2 | 195 | 0.14 | 0.19 | 0.24 | 0.29 | 0.33 | 0.38 |
| 3.4 | 207 | 0.15 | 0.20 | 0.25 | 0.30 | 0.35 | 0.40 |
| 3.6 | 220 | 0.16 | 0.21 | 0.26 | 0.31 | 0.36 | 0.42 |
| 3.8 | 232 | 0.17 | 0.23 | 0.28 | 0.34 | 0.40 | 0.45 |
| 4.0 | 244 | 0.18 | 0.24 | 0.30 | 0.36 | 0.42 | 0.48 |
| 4.2 | 256 | 0.19 | 0.25 | 0.31 | 0.37 | 0.44 | 0.50 |
| 4.4 | 268 | 0.20 | 0.26 | 0.33 | 0.39 | 0.46 | 0.52 |
| 4.6 | 281 | 0.20 | 0.27 | 0.34 | 0.41 | 0.48 | 0.55 |
| 4.8 | 293 | 0.21 | 0.29 | 0.36 | 0.43 | 0.50 | 0.57 |
| 5.0 | 305 | 0.22 | 0.30 | 0.37 | 0.45 | 0.52 | 0.59 |
| 5.2 | 317 | 0.23 | 0.31 | 0.39 | 0.46 | 0.54 | 0.62 |
| 5.4 | 330 | 0.24 | 0.32 | 0.40 | 0.48 | 0.56 | 0.64 |
| 5.6 | 342 | 0.25 | 0.33 | 0.42 | 0.50 | 0.58 | 0.66 |
| 5.8 | 354 | 0.26 | 0.35 | 0.43 | 0.52 | 0.60 | 0.69 |
| 6.0 | 366 | 0.27 | 0.36 | 0.45 | 0.53 | 0.62 | 0.71 |
| 6.2 | 378 | 0.28 | 0.37 | 0.46 | 0.55 | 0.64 | 0.71 |
| 6.4 | 391 | 0.29 | 0.38 | 0.48 | 0.57 | 0.66 | 0.76 |
| 6.6 | 403 | 0.29 | 0.39 | 0.49 | 0.59 | 0.69 | 0.78 |
| 6.8 | 415 | 0.30 | 0.40 | 0.50 | 0.61 | 0.71 | 0.81 |
| 7.0 | 427 | 0.31 | 0.42 | 0.52 | 0.62 | 0.73 | 0.83 |
| 7.2 | 439 | 0.32 | 0.43 | 0.53 | 0.64 | 0.75 | 0.85 |
| 7.4 | 452 | 0.33 | 0.44 | 0.55 | 0.66 | 0.77 | 0.88 |
| 7.6 | 464 | 0.34 | 0.45 | 0.56 | 0.68 | 0.79 | 0.90 |
| 7.8 | 476 | 0.35 | 0.46 | 0.58 | 0.70 | 0.81 | 0.93 |
| 8.0 | 488 | 0.36 | 0.48 | 0.59 | 0.71 | 0.83 | 0.95 |
| 8.2 | 500 | 0.36 | 0.49 | 0.61 | 0.73 | 0.85 | 0.97 |
| 8.4 | 513 | 0.37 | 0.50 | 0.62 | 0.75 | 0.87 | 1.00 |

Values for maximum engine fuel volume requirements are calculated based on 100% engine efficiency. Many factors can affect engine performance, such that no engine may perform at 100% efficiency. These values are to serve as reference only.

FIG. 13

Appendix B
Return Fuel System Diagnostic Guide

| Results Scenario | Idle Pressure | Idle Flow | Peak Pressure | Peak Flow | Potential Causes |
|---|---|---|---|---|---|
| 1 | Normal | Greater than maximum fuel volume requirement* | Normal | .7 to 1.0 GPM (2.5 to 4.0 LPM) | Fuel system is operating normally |
| 2 | Normal to slightly low | Less than maximum fuel volume requirement* | Normal | Low | Blocked fuel filter, inlet screen or pinched supply line |
| | | | 50% to 100% higher than spec | Less than .7 GPM (2.5 LPM) | |
| 3 | Low | Greater than .7 GPM (2.5 LPM) | Normal | .7 to 1.0 GPM (2.5 to 4.0 LPM) | Under-restricting pressure regulator |
| | | | 50% to 100% higher than spec | | |
| 4 | High | Less than maximum fuel volume requirement* | Normal | .7 to 1.0 GPM (2.5 to 4.0 LPM) | Over-restricting pressure regulator |
| | | | 50% to 100% higher than spec | | |
| 5 | Low | Less than maximum fuel volume requirement* | Low | Low | Failing fuel pump or insufficient power supply |
| | | | Less than 50% higher than spec | Less than .7 GPM (2.5 LPM) | |

*See Appendix A for maximum engine fuel volume requirement

FIG. 13A

Appendix B
Return Fuel System Diagnostic Guide

Scenario 2
Diagnosis:
A restriction to the supply of fuel to the engine such as a clogged inlet screen, inline filter, or pinched fuel supply line will reduce the flow of fuel. However, pressure will remain normal or drop only 1 or 2 psi below spec. If the flow at idle is less than the calculated maximum fuel volume requirement, then the engine will be starved of fuel in a heavy-load condition such as wide-open throttle.

Additional Action:
Inspect the fuel supply line for damage. Connect the test apparatus between fuel tank and inline filter, and retest. If flow is normal, replace inline filter. If flow is still low replace inlet screen/sock.

Scenario 3
Diagnosis:
High flow and low pressure at idle are a sure indication of an under-restricting pressure regulator. If values for peak pressure and flow remain normal, replace the pressure regulator.

Scenario 4
Diagnosis:
High pressure and low flow at idle indicates too much restriction in the path of the fuel as it returns from the fuel rail to the fuel tank. The cause can be an over-restricting pressure regulator or pinched return line.

Additional Action:
Inspect the fuel return line for damage. If the regulator is vacuum modulated, check the level of vacuum at the regulator. If it is low, repair the cause. Connect the test apparatus after the pressure regulator and retest. If pressure remains high, the return line is restricted. If it drops off to near zero, replace the pressure regulator.

Scenario 5
Diagnosis:
Low values for idle and peak pressure and flow are an indication that the output of the fuel pump is not adequate.

Additional Action:
Verify that the vehicle is not using a multiple speed pump. If so, a scanner must be used to operate the pump at its highest speed. Before replacing pump, follow the vehicle manufacturer's proper procedure to check for low voltage or a bad connection or ground.

Appendix C
Returnless (mechanically regulated) Fuel System Diagnostic Guide

| Results Scenario | Idle Pressure | Peak Flow | Peak Demand Pressure | Potential Causes |
|---|---|---|---|---|
| 1 | Normal | .7 to 1.0 GPM (2.5 to 4.0 LPM) | Normal | Less than 10% below idle pressure | Fuel system is operating normally |
| 2 | Normal | Less than .7 GPM (2.5 LPM) | Low | Greater than 10% below idle pressure | Blocked fuel filter, inlet screen or supply line |
| 3 | Low | .7 to 1.0 GPM (2.5 to 4.0 LPM) | Low | Greater than 10% below manufacturer's specification | Under-restricting pressure regulator |
| 4 | High | .7 to 1.0 GPM (2.5 to 4.0 LPM) | High | Above manufacturer's specification | Over-restricting pressure regulator |
| 5 | Low | Less than .7 GPM (2.5 LPM) | Low | Greater than 10% below manufacturer's specification | Failing fuel pump or insufficient power supply |

Appendix C

Returnless (mechanically regulated) Fuel System Diagnostic Guide

Scenario 2
Diagnosis:
A restriction to the supply of fuel to the engine such as a clogged inlet screen, inline filter, or pinched fuel supply line will reduce the flow of fuel. This will be evident by the reduction in peak flow. Idle pressure will remain normal or drop only 1 or 2 psi below spec. Capability pressure will be low, depending on the amount of restriction and the type of return/filtration method used.

Additional Action:
Inspect the fuel supply line for damage. If the return/filtration method is type 1 or 2, connect the test apparatus between fuel tank and inline filter, and retest. If peak flow is normal, replace inline filter. If flow is still low replace inlet screen/sock.

Scenario 3
Diagnosis:
Low idle and capability pressure, combined with normal peak flow is a sure indication of an under-restricting pressure regulator.

Scenario 4
Diagnosis:
High idle and capability pressure, combined with normal peak flow is a sure indication of an over-restricting pressure regulator.

Scenario 5
Diagnosis:
Low values for all three indicators are an indication that the output of the fuel pump is not adequate.

Additional Action:
Verify that the vehicle is not using a multiple speed pump. If so, a scanner must be used to operate the pump at its highest speed. Before replacing pump, follow the vehicle manufacturer's proper procedure to check for low voltage or a bad connection or ground.

Appendix D
Returnless (electronically regulated) Fuel System Diagnostic Guide

| Results Scenario | Idle Pressure | Peak Demand Pressure | Peak Pressure | Peak Flow | Potential Causes |
|---|---|---|---|---|---|
| 1 | Normal | Normal | Less than 10% below idle pressure | Normal | .7 to 1.0 GPM (2.5 to 4.0 LPM) | Fuel system is operating normally |
| 2 | Normal | Low | Greater than 10% below idle pressure | Normal | Less than .7 GPM (2.5 LPM) | Blocked fuel filter, inlet screen or pinched supply line |
| 3 | Low | Low | Greater than 10% below idle pressure | Low | .7 to 1.0 GPM (2.5 to 4.0 LPM) | Electronic control failure, failing fuel pump, or insufficient power supply |
| 4 | High | High | Less than maximum fuel volume requirement* | High | .7 to 1.0 GPM (2.5 to 4.0 LPM) | |
| 5 | Low | Low | Less than maximum fuel volume requirement* | Less than 50% higher than spec | Less than .7 GPM (2.5 LPM) | |

*See Appendix A for maximum engine fuel volume requirement

Appendix D

Returnless (electronically regulated) Fuel System Diagnostic Guide

Scenario 2

Diagnosis:
A restriction to the supply of fuel to the engine such as a clogged inlet strainer, inline filter, or pinched fuel supply line will reduce the flow of fuel. However, idle and peak pressure will remain normal or drop only 1 or 2 psi below manufacturer's specification. If the peak flow at idle is less than the calculated maximum fuel volume requirement, and the capability pressure is low then the engine will be starved of fuel in a heavy-load condition such as wide-open throttle.

Additional Action:
Inspect the fuel supply line for damage. Connect the test appartus between fuel tank and inline filter, and retest. If the peak flow and capability pressure are normal, replace inline filter. If still low, replace inlet screen/sock.

Scenario 3, 4, 5

Diagnosis:
If testing with the test apparatus indicates the engine is not receiving the proper fuel pressure and volume, and a clogged inline filter or fuel line are determined not to be the cause, then a failure of the electronic control system or the fuel pump is the most likely cause. Follow the vehicle manufacturer's recommended procedure for troubleshooting these components to determine the malfunction.

APPARATUS AND METHOD FOR TESTING FUEL FLOW

BACKGROUND OF THE INVENTION

This invention relates generally to fuel flow systems for an internal combustion engine, and more particularly to apparatus and method for testing the flow of fuel from the fuel tank to such an engine.

In older conventional fuel systems, fuel is pumped at a relatively high rate (e.g., 0.4-0.5 gpm) from the fuel tank to the engine which uses only a relatively small amount of the fuel, the remaining unused portion being delivered back to the fuel tank for recycling. This type of system is often referred to as a standard return fuel system, since the unused fuel is returned to the fuel tank. One drawback of a "return" system is that the temperature of the fuel rises over time as it cycles past the engine and returns to the tank, and the increase in temperature leads to the evaporation of greater amounts of fuel into the atmosphere.

In more recent fuel systems, fuel is pumped at a much lower rate (e.g., 0.05-0.1 gpm) corresponding to the actual need of the engine. All of the fuel pumped to the engine is used; none of the fuel is returned from the engine to the fuel tank. This type of system is known as a "returnless" fuel system.

In testing for proper fuel flow to an engine, it is important to test both the rate of fuel flow and fuel pressure, since testing only one of the conditions is often not sufficient for reliably and accurately diagnosing a problem with the fuel system (e.g., bad fuel pump, faulty pressure regulator, clogged fuel filter, blocked fuel lines, etc.). In a "return" system, the testing for both conditions is relatively easy, since the flow rates are relatively large. However, in a "returnless" system, the flow rate is difficult to measure accurately. This can cause the misdiagnosis of a problem with the fuel system. As a result, costly components, such as fuel pumps, are unnecessarily replaced in a vain attempt to correct a problem arising from a different source.

There is a need, therefore, for an improved apparatus and method for reliably and accurately testing both return and returnless fuel systems. Co-assigned U.S. Pat. No. 7,228,729 shows certain embodiments of such improved apparatus. Other embodiments are possible, and this invention is directed to such embodiments.

SUMMARY OF THE INVENTION

In general, apparatus of this invention is used for testing fuel flow in a return or returnless fuel injection system of the type comprising a fuel tank, at least one fuel injector for injecting fuel into an internal combustion engine, and a fuel pump for pumping fuel from the fuel tank to at least one fuel injector. The apparatus comprises a primary flow passage having an inlet adapted for connection to the fuel injection system for receiving fuel pumped by the fuel pump, and an outlet adapted for connection to the fuel injection system for flow of fuel to the at least one fuel injector. The apparatus includes a first device for measuring a rate of fuel flow through the primary flow passage, and a second device for measuring a fuel pressure in the primary flow passage. A bypass passage has an inlet adapted to communicate with the primary flow passage and an outlet for delivery of fuel to a fuel receptacle other than said fuel tank. A bypass valve is movable between a first position in which the bypass passage is closed and the primary flow passage is open whereby fuel is adapted to flow to the engine but not to the fuel receptacle and a second position in which the bypass passage is open and the primary flow passage is open whereby fuel is adapted to flow both to the engine and to the fuel receptacle. The bypass valve is movable to the first position for testing fuel flow in a return fuel injection system and to the second position for testing fuel flow in a returnless fuel injection system.

This invention is also directed to a method of using apparatus for testing fuel flow in a return or returnless fuel injection system of the type comprising a fuel tank, at least one fuel injector, and a fuel pump for pumping fuel from the fuel tank to the at least one fuel injector. The apparatus comprises a primary flow passage, a first device for measuring a rate of fuel flow through the primary flow passage, and a second device for measuring a fuel pressure in the primary flow passage. A bypass passage has an inlet adapted to communicate with the primary flow passage and an outlet for delivery of fuel to a fuel receptacle other than the fuel tank. A bypass valve downstream from the first device is movable between a first position in which the bypass passage is closed and the primary flow passage is open whereby fuel is adapted to flow to the engine but not to the fuel receptacle and a second position in which the bypass passage is open and the primary flow passage is open whereby fuel is adapted to flow both to the engine and to the fuel receptacle. The method comprises the steps of connecting an inlet of the primary flow passage to the return or returnless fuel injection system for receiving fuel pumped by the fuel pump, connecting the outlet of the primary fuel flow passage to the return or returnless fuel injection system for flow of fuel to the at least one fuel injector, and selectively moving the bypass valve to its first position in which fuel flows to at least one fuel injector but not to the fuel receptacle for testing fuel flow in a return fuel injection system or to its second position in which fuel flows to at least one fuel injector and to the fuel receptacle for testing fuel flow in a returnless fuel injection system.

In another aspect, this invention is directed to apparatus for testing fuel flow in a return or returnless fuel injection system comprising at least one fuel injector for injecting fuel into an internal combustion engine and a fuel pump for pumping fuel to the at least one fuel injector. The apparatus comprises a primary flow passage having an inlet connected to the fuel injection system for receiving fuel pumped by the fuel pump, and an outlet connected to the fuel injection system for flow of fuel to the at least one fuel injector. A first device is provided for measuring the rate of fuel flow through the primary flow passage. A second device is provided for measuring a fuel pressure in the primary flow passage. A bypass passage downstream from the first device has an inlet adapted to communicate with the primary flow passage and an outlet for delivery of fuel to a fuel receptacle. A bypass valve is movable between a first position in which the bypass passage is closed and the primary flow passage is open whereby fuel is adapted to flow to the engine but not to the fuel receptacle and a second position in which the bypass passage is open and the primary flow passage is open whereby fuel is adapted to flow both to the engine and to the fuel receptacle. The bypass valve is movable to its first position for testing fuel flow in a return fuel injection system and to its second position for testing fuel flow in a returnless fuel injection system.

Other objects and features will be in part apparent and in part pointed out hereinafter.

BRIEF DESCRIPTION OF THE DRAWINGS

FIG. 3 is an enlarged vertical section of the apparatus of FIG. 1 with portions removed and showing a bypass valve in a first (closed) position;

FIG. 12 is an Appendix A showing maximum engine fuel volume requirements;

FIG. 13 is an Appendix B showing a diagnostic guide for a return fuel system;

FIG. 13A is a continuation of Appendix B;

FIG. 14 is an Appendix C showing a diagnostic guide for a mechanically regulated returnless fuel system;

FIG. 14A is a continuation of Appendix C;

FIG. 15 is an Appendix D showing a diagnostic guide for an electronically regulated returnless fuel system; and FIG. 15A is a continuation of Appendix D.

Corresponding parts are designated by corresponding reference numbers throughout the several views of the drawing.

DETAILED DESCRIPTION

Figure 1:
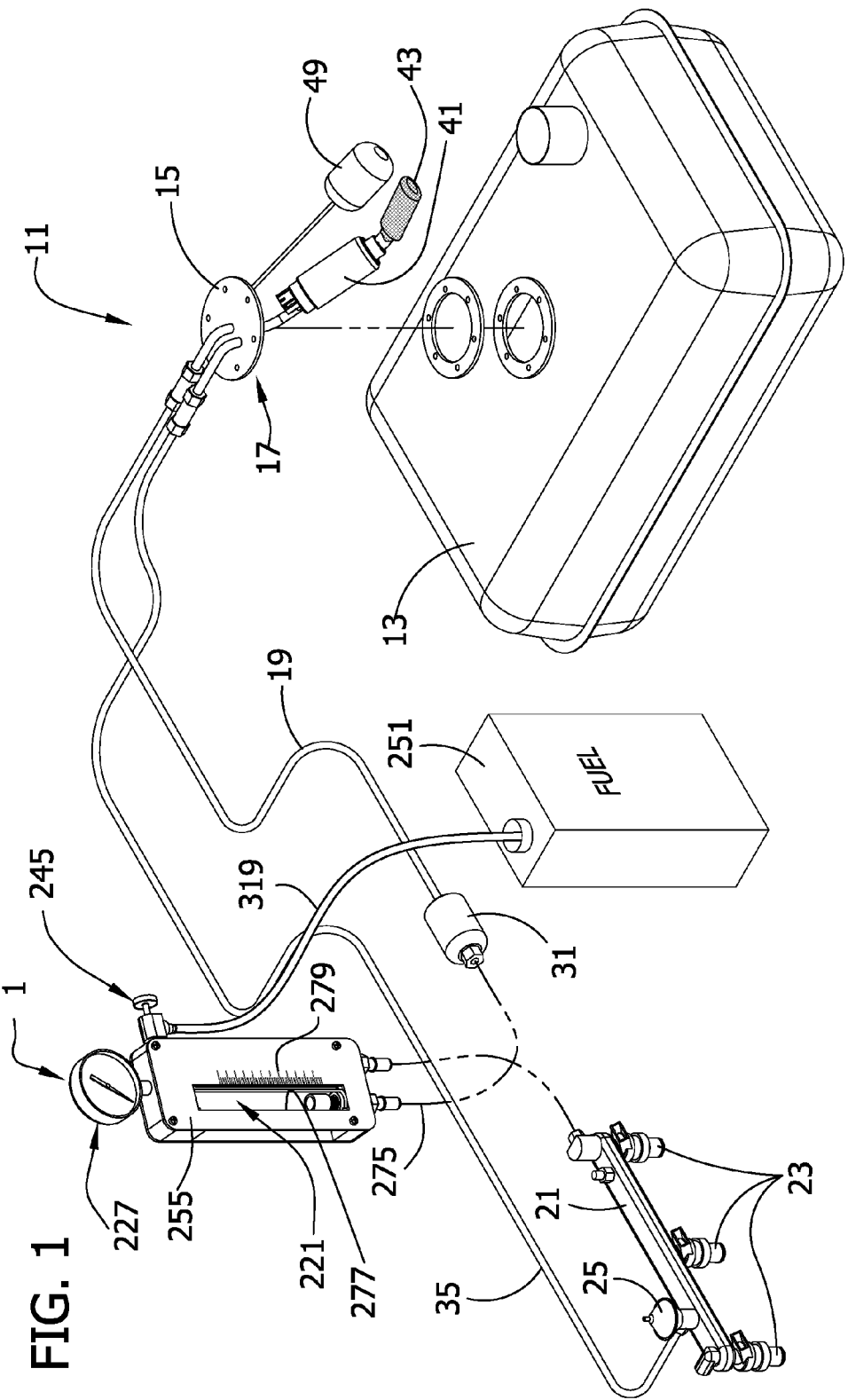
FIG. 1 is a schematic view of one embodiment of an apparatus of this invention as used to test a return fuel system.

FIG. 1 is a schematic view showing one embodiment of fuel testing apparatus of the present invention, generally designated 1, as used for testing the fuel flow in a standard "return" fuel system, generally designated 11. The fuel system 11 includes a fuel tank 13 and cap 15, a fuel pump assembly 17 mounted on the cap for pumping fuel from the tank 13 through a feed line 19 to one or more fuel rails 21 each comprising a series of fuel injectors 23, a fuel pressure regulator 25 on each fuel rail, a fuel filter 31 in the feed line 19, and a return fuel line 35 for the return of unused fuel to the fuel tank 13. The fuel pump assembly 17 includes, among other things, a fuel pump 41, a fuel filter 43 upstream of the fuel pump and a fuel level sensor 49.

Figure 2:
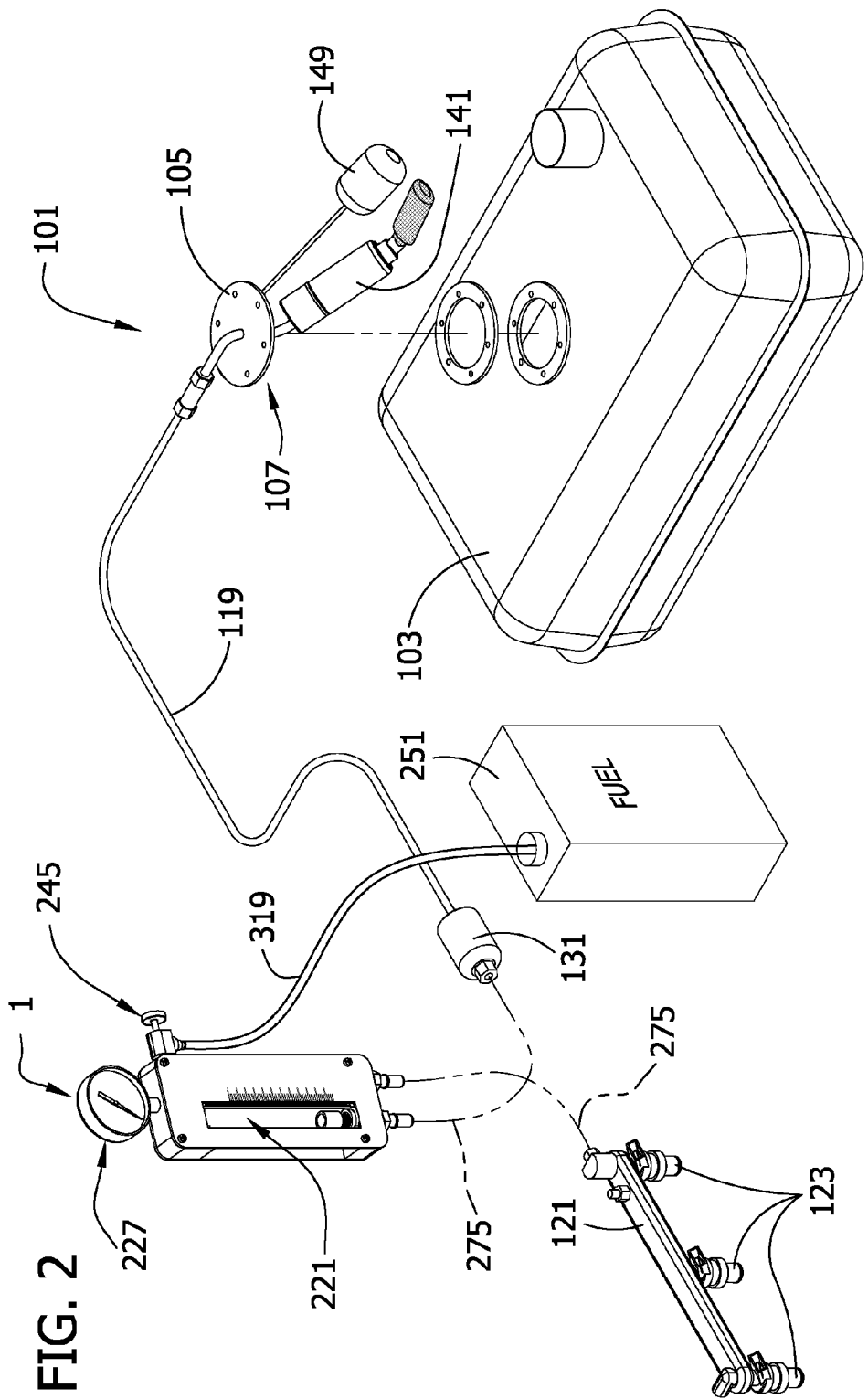
FIG. 2 is a schematic view of the apparatus of FIG. 1 as used to test a returnless fuel system.

FIG. 2 is a schematic view showing apparatus 1 as used for testing fuel flow in a standard "returnless" fuel system, generally designated 101. The system includes a fuel tank 103, a fuel pump assembly 107 for pumping fuel from the tank 103 through a feed line 119 to one or more fuel rails 121 each comprising a series of fuel injectors 123 and a fuel filter 131 in the feed line 119. The fuel pump assembly 107 includes among other things, a fuel pump 141, a fuel level sensor 149, and a cap 105. Because all fuel pumped to the fuel rail(s) 121 is used, there is no need for a return line to the fuel tank 103.

As will be described, the apparatus 1 is capable of measuring the fuel flow rate and fuel pressure in the fuel feed line (e.g., 19 in FIG. 1) of a return fuel system and in the fuel feed line (e.g., 119 in FIG. 2) of a returnless fuel system. In use, the apparatus 1 is typically installed at a location between the fuel filter (e.g., 31, 131) and the fuel injectors (e.g., 23, 123), as shown in FIGS. 1 and 2, although other locations are contemplated.

Figure 3A:
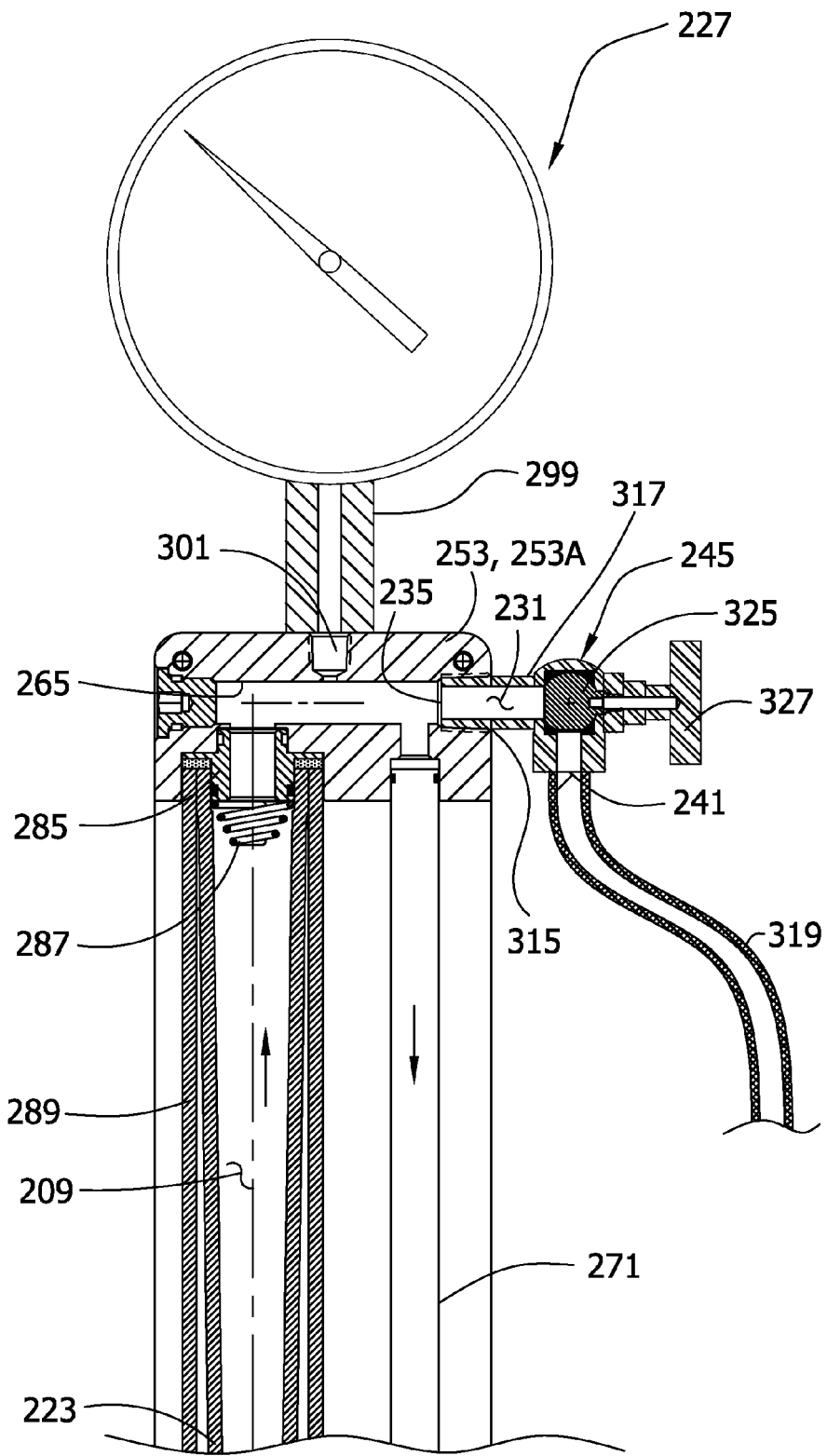
FIG. 3A is an enlarged portion of FIG. 3 showing a portion of the apparatus of FIG. 1, including a device for measuring fuel pressure.
Figure 4:
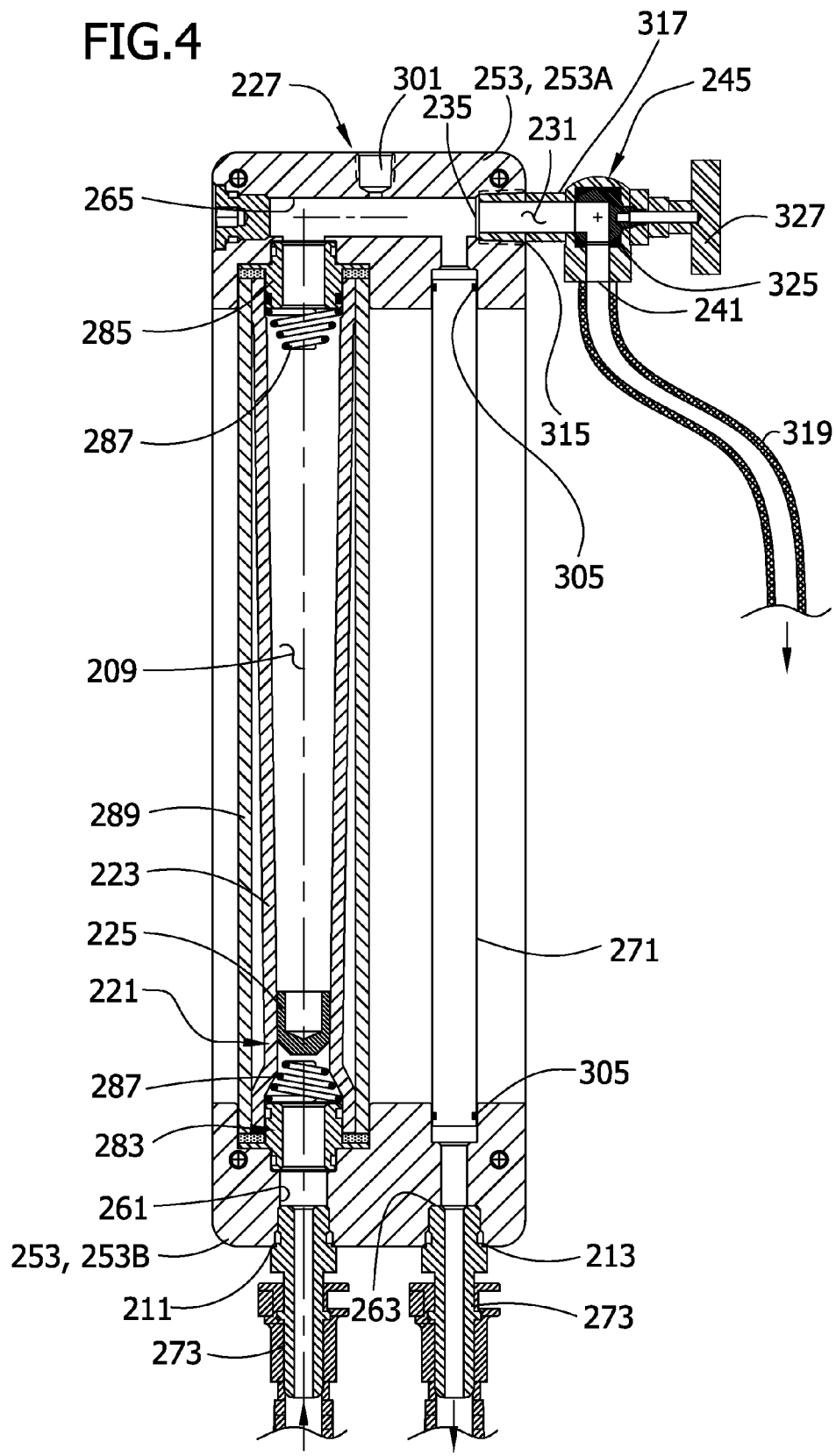
FIG. 4 is a view similar to FIG. 3 but showing the bypass valve in a second (open) position.
Figure 5:
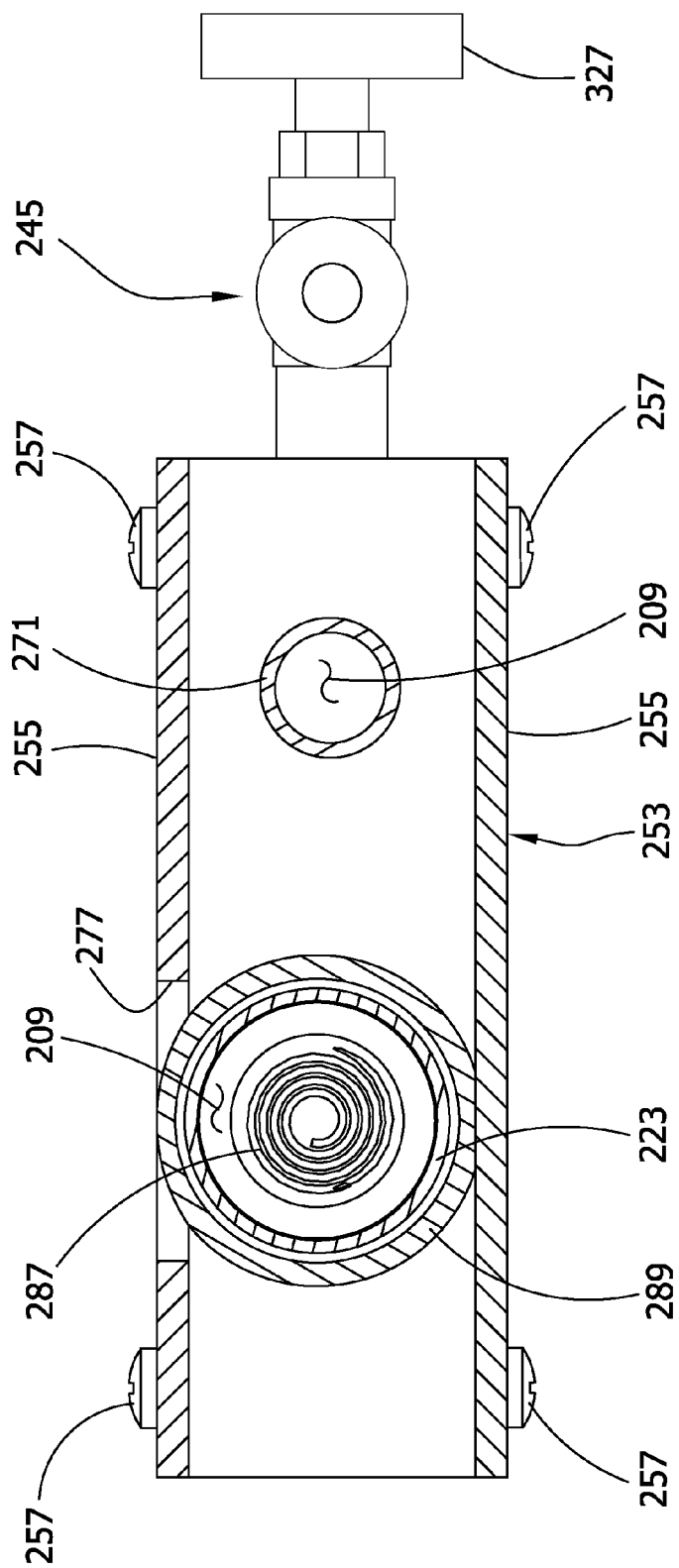
FIG. 5 is an enlarged horizontal section on line 5-5 of FIG. 3.
Figure 6:
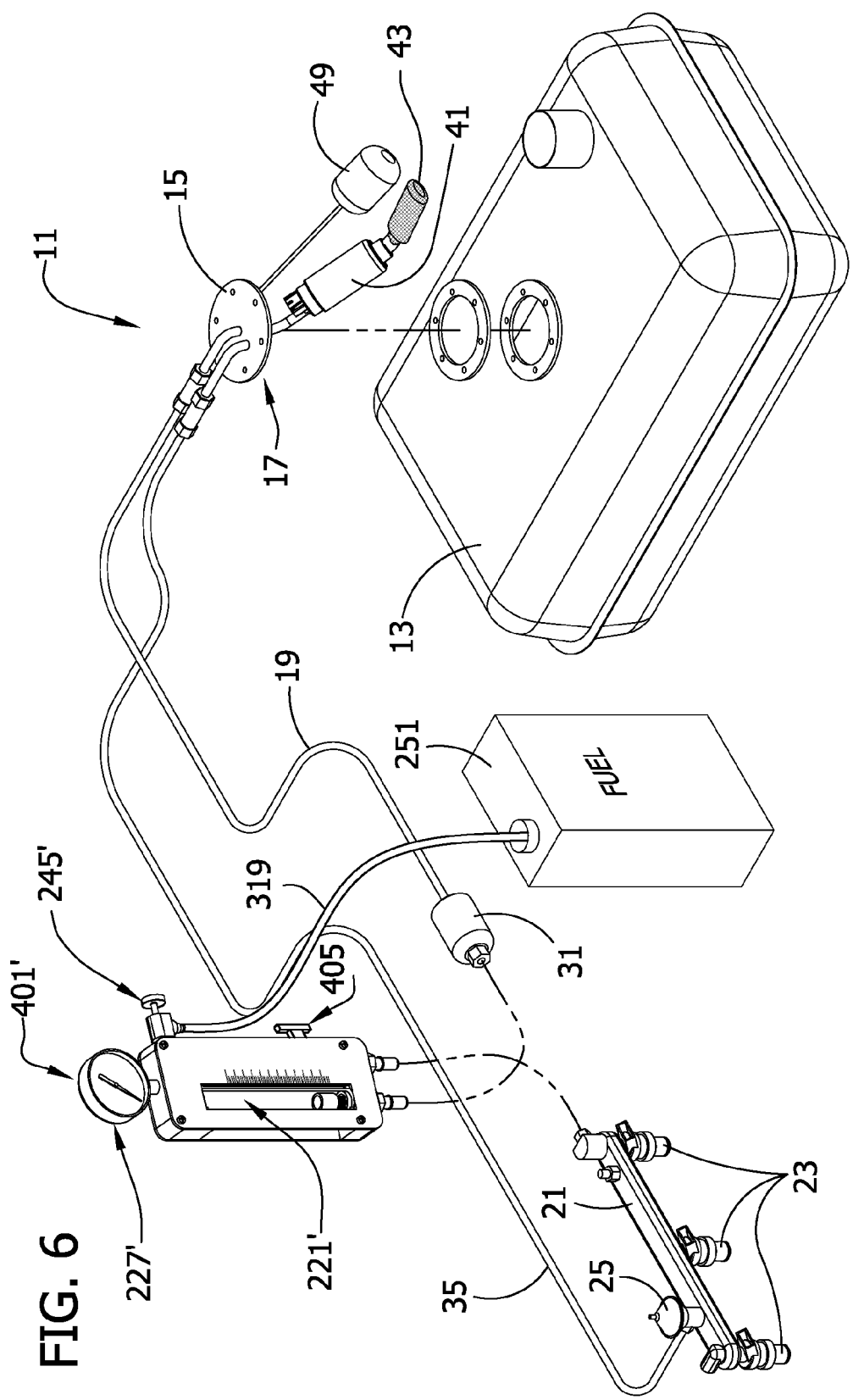
FIG. 6 is a view similar to FIG. 1 showing another embodiment of an apparatus of this invention as used to test a return fuel system.
Figure 7:
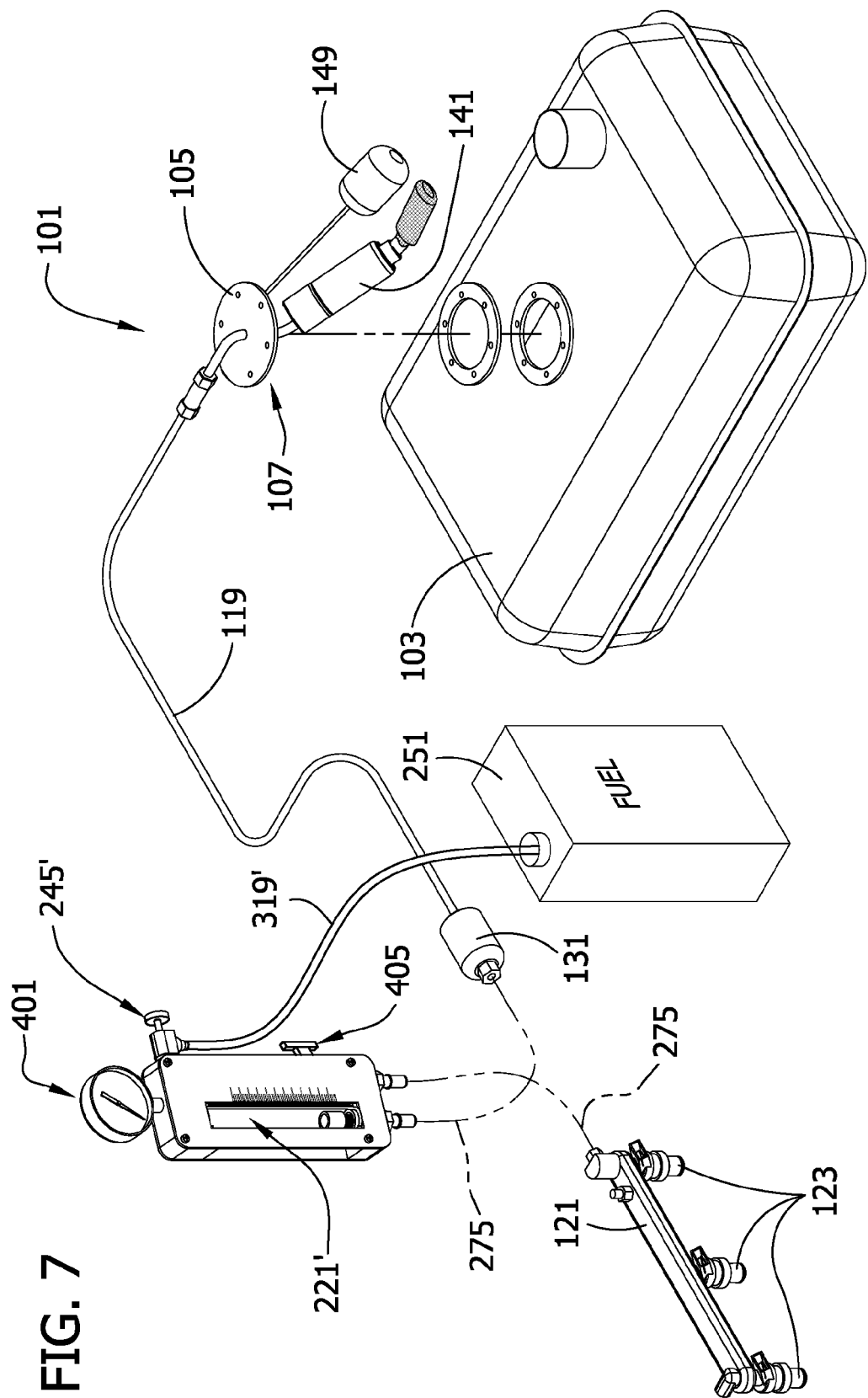
FIG. 7 is a view similar to FIG. 2 showing the embodiment of FIG. 6 as used to test a returnless fuel system.

Referring specifically to FIGS. 3-5, in general, apparatus 1 comprises a primary flow passage 209 having an inlet 211 adapted for connection to a fuel system (e.g., 11, 101) for receiving fuel pumped by the fuel pump (17, 107) of the system, and an outlet 213 adapted for connection to the fuel system for flow of fuel to the at least one fuel injector (e.g., 23, 123). The apparatus 1 also includes, a first device generally indicated at 221 for measuring a rate of fuel flow through the primary flow passage 209, and a second device generally indicated at 227 for measuring fuel pressure in the primary flow passage 209. By way of example, the first device 221 may be a variable area flow meter in the form of a rotameter comprising a tube 223 of varying cross section, and a float 225 in the tube. Also by way of example, the second device 227 may be a pressure gauge for sensing and displaying the pressure of the fuel in the flow passage 209 downstream from the tube 223. A bypass passage 231 is provided having an inlet 235 which communicates with the primary flow passage 209 and an outlet 241 which is adapted to communicate with a fuel receptacle 251. A bypass valve, generally designated 245, is movable between a first position (FIG. 3) in which the bypass passage 231 is closed and the primary flow passage 209 is open whereby fuel is adapted to flow to the outlet 213 of the primary flow passage 209 and a second position (FIG. 4) in which the bypass passage 231 is open and the primary flow passage 209 is open whereby fuel is adapted to flow to the outlet 213 of the primary flow passage and also through the bypass passage to the fuel receptacle 251. As will be described in more detail below, the bypass valve 245 is movable between its stated first (FIG. 3) and second (FIG. 5) positions for testing fuel flow in return and returnless fuel flow systems of the type shown, for example, in FIGS. 1 and 2.

In the embodiment of FIGS. 3-5, the apparatus 1 also includes a housing 253 comprising upper and lower end portions, designated at 253A and 253B, respectively. In this embodiment, the end portions are formed by two blocks of suitable material (e.g., metal). The housing 253 also includes a pair of parallel face plates 255 secured (e.g., by fasteners 257) to the upper and lower end blocks 253A, 253B at the front and back of the housing 253. The housing 253 can have other configurations without departing from the scope of this invention.

Referring to FIGS. 3 and 4, the primary flow passage 209 of this particular embodiment is formed by several discrete passage segments or bores, including an inlet bore 261 extending up through the lower end block 253B of the housing 253, an outlet bore 263 extending down through the lower end block 253B of housing, and an intermediate bore 265 in the upper end block 253A of the housing. The flow passage 209 is further defined by the variable area flow tube 223 connecting the inlet bore 261 and the intermediate bore 265 and a flow tube 271 connecting the intermediate bore 265 and the outlet bore 263. The flow passage 209 can have other configurations without departing from the scope of this invention. The inlet and outlet bores 261, 263 of the primary flow passage 209 are connected to the fuel system (11, 101) by connectors 273 fitted in respective bores 261, 263 and projecting out from the lower end portion 253B of the housing 253. Each connector 273 has an upper end sealingly received in a respective bore and a lower end configured for attachment to a hose 275 or other component in communication with the fuel system (11, 101).

In the embodiment of FIGS. 3-5, the flow tube 223 of variable cross section tapers from a smaller cross sectional dimension adjacent the lower end block 253B of the housing 253 to a larger cross sectional dimension adjacent the upper end block 253A of the housing 253. As will be understood by the skilled person; the float 225 in the tube 223 rises and falls according to the rate of fuel flow through the tube 223. A window 277 is provided in the front face plate 255 for viewing the flow tube 223 and float 225 (see FIG. 1). A scale 279 with calibration marks is provided on the front face plate 255 alongside the window 277 to indicate the flow rate in appropriate units of flow (e.g., gpm). The tube 223 is desirably of a transparent material for viewing the position of the float 225 in the tube 223 to permit an accurate reading of the flow rate by using the calibration marks of the scale 279, and also for viewing characteristics of the fuel, such as color, aeration and other physical properties indicative of the condition of the fuel and, relatedly, the fuel system (11, 101). Preferably, the tube is made out of a non-plastic material such as glass (e.g., glass borosilicate), since plastic may be adversely affected by certain types of fuel with additives. The variable area tube 223 is secured in place at its lower end by a lower tube retainer 283 threaded into the inlet bore 261 and at its upper end by an upper tube retainer 285 threaded into the intermediate bore 265 (see FIGS. 3 and 4). Movement of the float 225 in the tube 223 is cushioned by tapered coil compression springs 287 seated on the two retainers 283, 285. The flow tube 223 is protected by a surrounding sleeve 289 of a suitable transparent, high-strength protective material such as acrylic or glass. The flow tube 223 and associated mounting arrangement can have other configurations without departing from the scope of this invention.

As best shown in FIG. 3, each tube retainer 283, 285 comprises a tubular body 290 having an upper end which is received in the lower end of the variable area flow tube 223, and a lower end received in a counter bore 291 at the outlet (upper) end of the inlet bore 261. Seals 293 (e.g., O-rings) are fitted in grooves around the exterior surface of the tubular body 290 for sealing against the inside of the flow tube 223 and the wall of the counter bore 291 to prevent leakage. In addition, the tubular body 290 has a peripheral radial flange 295 for supporting an annular seal 297 which is sealingly engaged by respective ends of the variable area flow tube 223 and its protective sleeve 289.

In the embodiment shown in FIGS. 1, 2 and 3A, the pressure gauge 227 is located for reading the pressure of the fuel in the intermediate bore 265 in the upper end portion 253A of the housing 253. The pressure gauge 227 is connected to the housing 253 via a fitting 299 which threads into a pressure port 301 extending down from the top of the upper end block 253A to the intermediate bore 265. It will be understood that the pressure gauge 227 could be installed at other locations along the primary flow passage 209 downstream from the flow measuring device 221 without departing from the scope of this invention.

Referring to FIGS. 4 and 5, the flow tube 271 connecting the inlet bore 261 and the intermediate bore 265 of the primary flow passage 209 is preferably of uniform cross section, e.g., circular. Seals 305 at the upper and lower ends of the flow tube 271 seal against leakage.

Referring to the particular embodiment of FIGS. 1-5, the bypass passage 231 is formed by an extension 315 of the intermediate passage 265, and a fitting 317 threaded or otherwise secured in the extension 315 and projecting laterally from one side of the housing. The fitting 317 mounts the bypass valve 255. The bypass passage 231 may have other configurations. A conduit 319 (e.g., a flexible hose) is connected to the fitting 317 for delivery of fuel to the fluid receptacle 251.

In the illustrated embodiment, the bypass valve 255 comprises a valve member 325 movable in the fitting 317 between the stated first position in which the valve member is closed to block the flow of fuel through the bypass passage 231, and the stated second position in which the valve member is open to permit flow through the bypass passage to the fuel receptacle 251. The arrangement is such that the primary flow passage 209 remains open regardless of whether the valve member 325 is open or closed, so that fuel continues to flow to the engine during testing. The bypass valve 245 has a handle 327 for moving the valve member 325 between its open and closed positions. Other mechanisms may be used for moving the valve member 325 between its stated first and second positions. The valve member 325 shown in the Figures is a rotatable ball element, but other types of valve elements may be used without departing from the scope of this invention.

The use of the fuel testing apparatus 1 in testing return and returnless fuel systems will now be described.

To test fuel flow in a return fuel system, the testing apparatus 1 is connected to the fuel system (e.g., system 11 in FIG. 1) at an appropriate location, e.g., in the fuel feed line 19 between the fuel pump 41 and the fuel injector(s) 23, usually as close as possible to the fuel rail 21. This can be done by hanging the apparatus 1 in a general vertical orientation, e.g., from the hood of a vehicle, and connecting the inlet and outlet connectors 273 on the housing 253 to appropriate segments of the fuel feed line 19. To conduct an "operational" test, the bypass valve 245 is moved to its first or closed position (FIG. 3), and the engine is started and operated at idle speed to initiate fuel flow through the feed line 19 to the apparatus 1 and through the primary flow passage 209 to the fuel injector(s) 23. As fuel flows through the apparatus 1, the float 225 will move up in the variable area tube 223 to a location corresponding to the rate of fuel flow (see FIG. 3). The flow rate is determined by reading the scale 279 alongside the tube 223. The system fuel pressure is also measured using the pressure gauge 227. Thus, both fuel flow rate and fuel pressure can be readily determined. If the fuel flow or fuel pressure readings are out of normal range, one or more of the components of the fuel delivery system may be faulty. A more accurate diagnosis can be reached by performing one or more of the tests described below.

One such test is referred to herein as a "peak flow" test. In this type of test, the bypass valve 255 is moved to its second or open position (FIG. 4), and the engine is operated at idle speed to initiate fuel flow through the feed line 19 to the apparatus 1. With the bypass valve open, fuel flows through the primary flow passage 209 to the fuel injector(s) 23 and through the bypass passage 231 to the fuel receptacle 251. In this mode, substantially all restrictions to fuel flow are removed. This allows the fuel pump 41 to operate at maximum output, the value of which can be determined by reading the flow measurement device 221. This value is compared to the rated capacity of the fuel pump to determine the condition of the pump.

Figure 11:
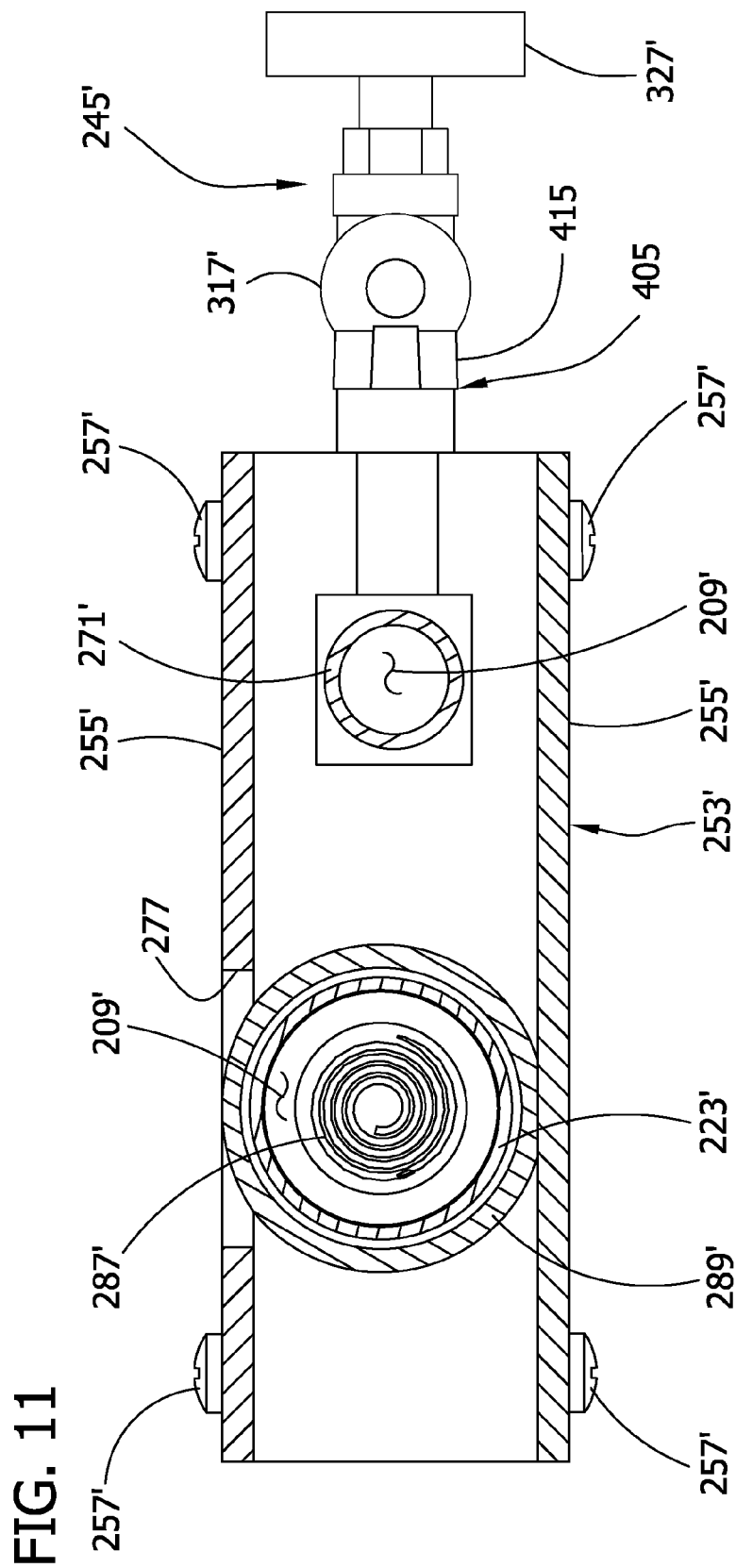
FIG. 11 is an enlarged horizontal section online 11-11 of FIG. 8.

The above tests will provide an idle pressure test value, an idle flow test value, and a peak flow test value. These test values are helpful in properly diagnosing a malfunctioning fuel delivery system and pinpointing the cause. By way of example, the peak flow test value can be compared to the recommended maximum engine fuel volume requirements of the engine under test. FIG. 11 shows an exemplary table listing such maximum engine fuel volume requirements at different speeds.

To perform more in-depth diagnostics, the test procedures outlined above can be varied by placing the apparatus 1 at different locations in the return fuel system 11. By way of example but not limitation, the initial test procedures described above may be carried out with the apparatus 1 connected in the fuel feed line 19 in a first zone between the fuel filter 31 and the fuel injector(s) 23. A second set of one or more such test procedures can be carried out with the apparatus 1 connected in the fuel feed line 19 in a second zone between the fuel tank 13 and the fuel filter 31. Further, a third set of one or more such test procedures can be carried out with the apparatus 1 connected in the fuel return line 35 in a third zone between the fuel rail 21 and the fuel tank 13. Depending on the suspected component malfunction, using the apparatus 1 to test in any one or more of these three zones or any combination of one or more of these three zones can help identify a malfunction of a particular fuel system component.

To test fuel flow in a returnless fuel system, the testing apparatus 1 is connected to the fuel system (e.g., system 101 in FIG. 2) at an appropriate location, e.g., in the fuel feed line 119 between the fuel pump 141 and the fuel injector(s) 123, usually as close as possible to the fuel rail 121. This can be done by connecting the inlet and outlet connectors 273 on the housing 253 to appropriate segments of the fuel feed line 119. To conduct an "operational" test, the bypass valve 245 is moved to its first or closed position (FIG. 3), and the engine is started and operated at idle speed to initiate fuel flow through the feed line 119 to the apparatus 1 and through the primary flow passage 209 to the fuel injector(s) 123. Using the fuel pressure gage 227, the fuel system pressure is read and compared to the desired or recommended fuel pressure. For further diagnosis, one or more of the additional tests described below may be conducted.

One such test is referred to as a "peak flow" test. In this type of test, the bypass valve 245 is moved to its second or open position (FIG. 4), and the engine is operated at idle speed to initiate fuel flow through the feed line 119 to the apparatus 1. With the bypass valve 245 open, fuel flows through the primary flow passage 209 to the fuel injector(s) 123 and through the bypass passage 231 to the fuel receptacle 251. In this mode, substantially all restrictions to fuel flow are removed. This allows the fuel pump 141 to operate at maximum output, the value of which can be determined by reading the flow measurement device 221. This value is compared to the rated capacity of the fuel pump 141 to determine the condition of the pump.

The above tests will provide an idle pressure test value, an idle flow test value, and a peak flow test value. These test values are helpful in properly diagnosing a malfunctioning fuel delivery system, and pinpointing the cause. By way of example, the peak flow test value can be compared to the recommended maximum engine fuel volume requirements of the engine. An exemplary table listing such maximum engine fuel volume requirements for different speeds is shown in FIG. 11.

A "peak demand pressure" test may also be conducted using the apparatus 1 to diagnose a returnless fuel system. In this type of test, the bypass valve 245 is moved to its first or closed position (FIG. 3), and the engine is operated at idle speed to initiate fuel flow through the feed line 119 to the apparatus 1. The bypass valve is then progressively (gradually) moved toward its fully open position until the flow measurement device 221 indicates an amount of fuel flow equivalent to the maximum fuel flow required by the engine at one or more selected operational speeds, such as indicated, for example, in the table of FIG. 11. This should occur before the bypass valve 245 reaches its fully open position. The fuel pressure is then read from the fuel pressure gage 227. This "peak demand pressure" value can also be used as a helpful diagnostic tool. By way of example but not limitation, this pressure value should be no more than a predetermined amount below a normal or specified fuel pressure (e.g., no more than ten percent below normal idle fuel pressure or no more than ten percent below the manufacturer's operating pressure at a specified engine load).

Figure 8:
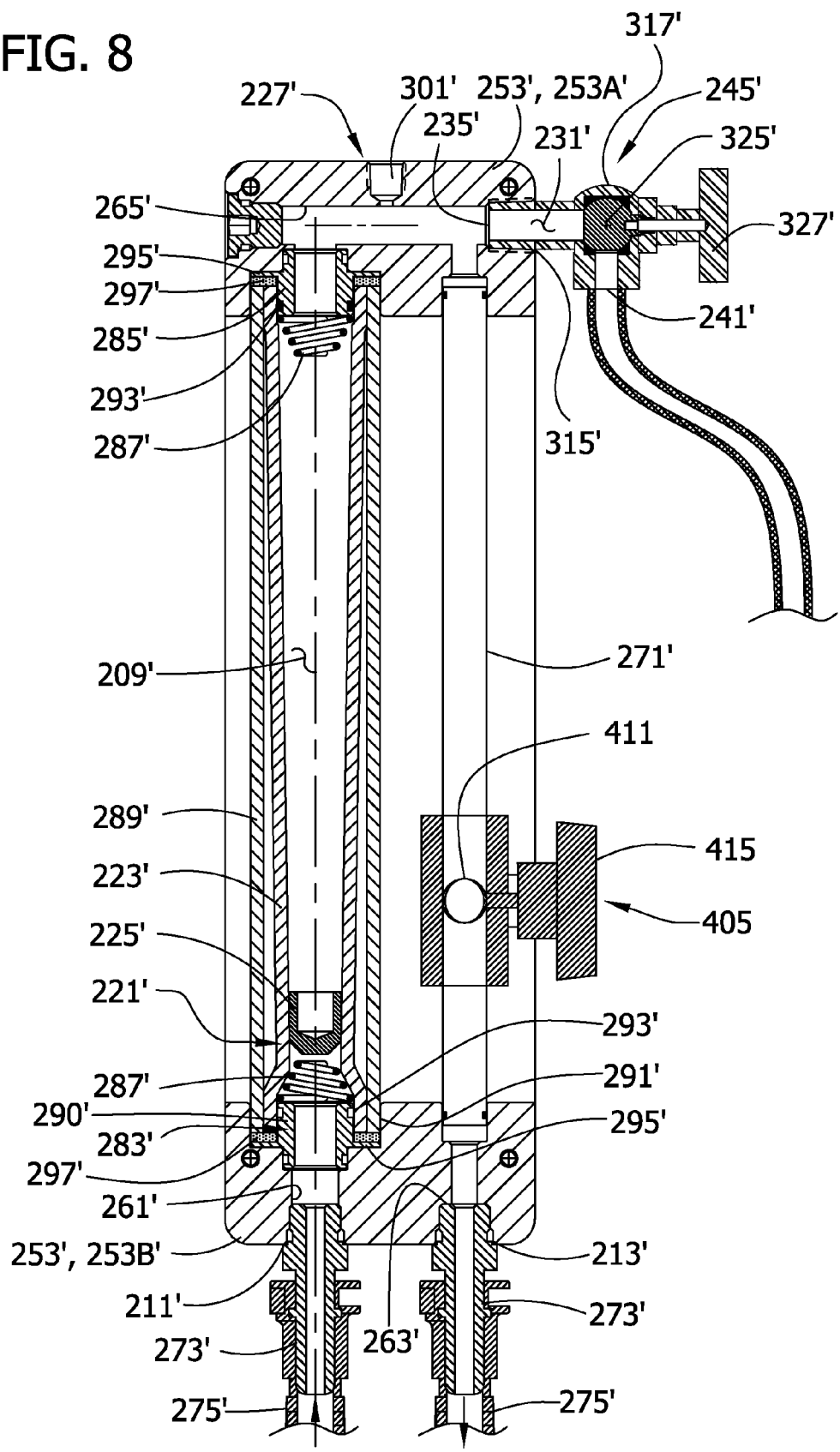
FIG. 8 is an enlarged vertical section of the apparatus of FIG. 7 with portions removed and showing a bypass valve in a first (closed) position and a deadhead valve in an open position.
Figure 8A:
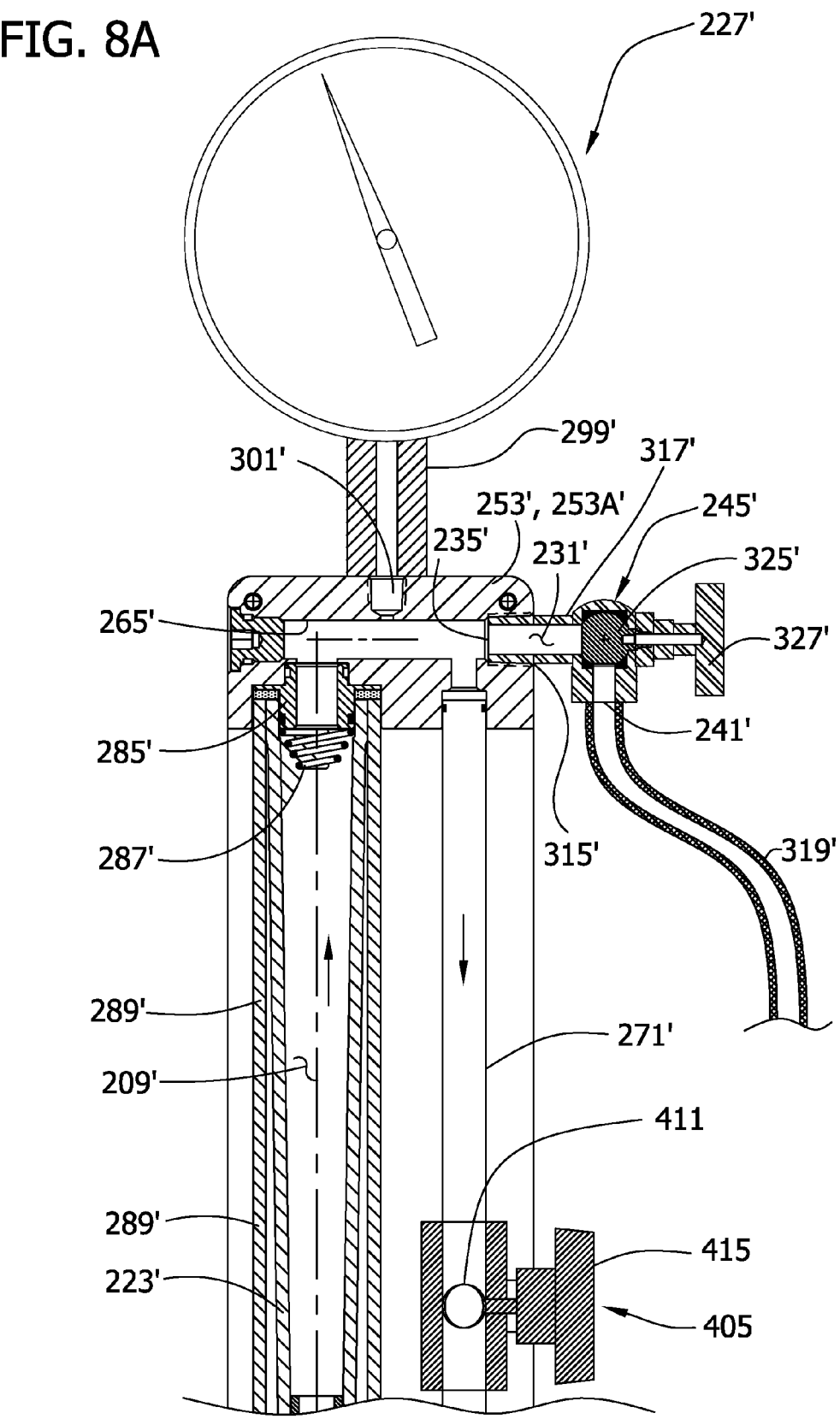
FIG. 8A is an enlarged portion of FIG. 8 showing a portion of the apparatus of FIG. 6, including a device for measuring fuel pressure.
Figure 9:
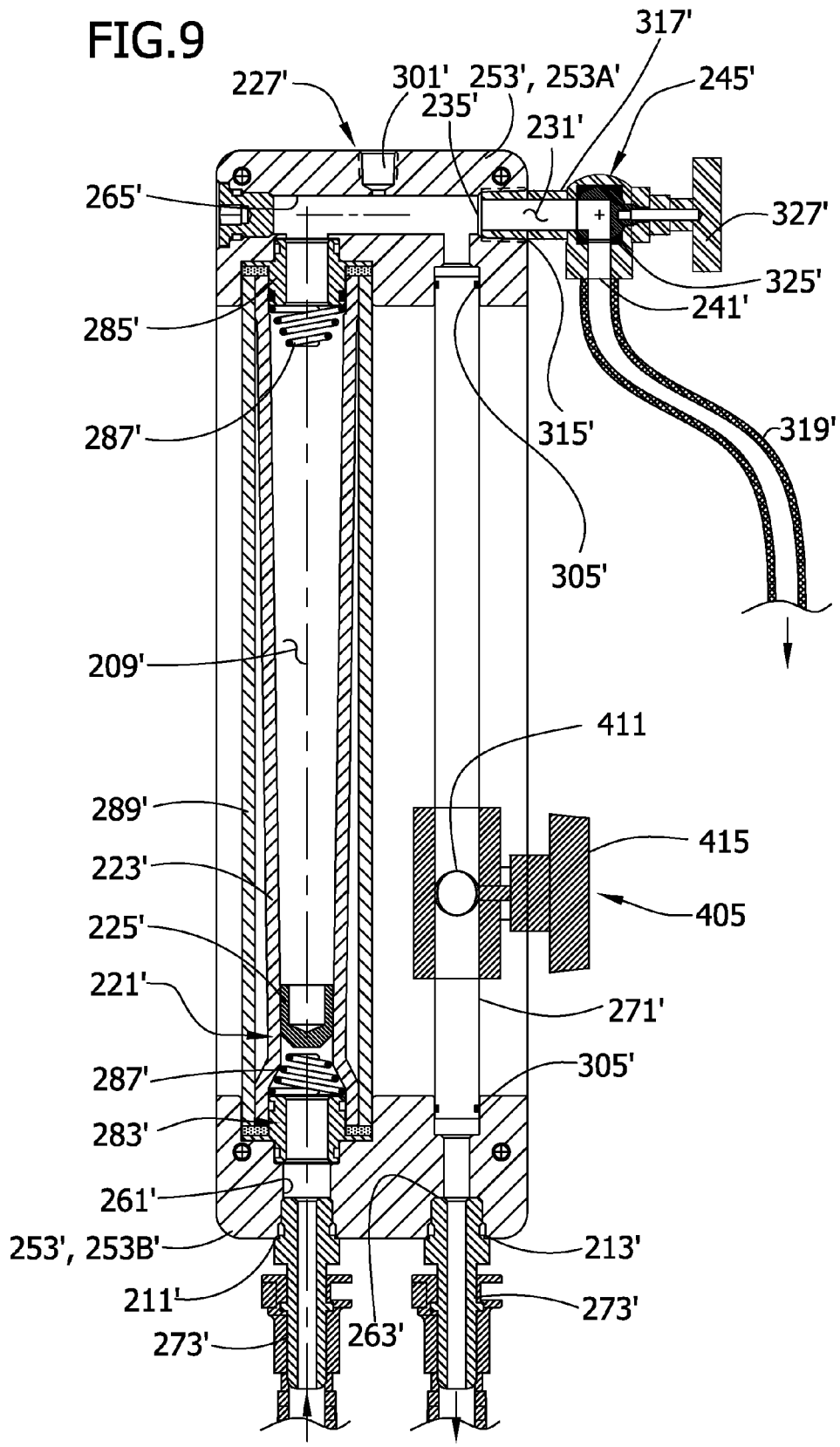
FIG. 9 is a view similar to FIG. 8 but showing the bypass valve in a second (open) position.
Figure 10:
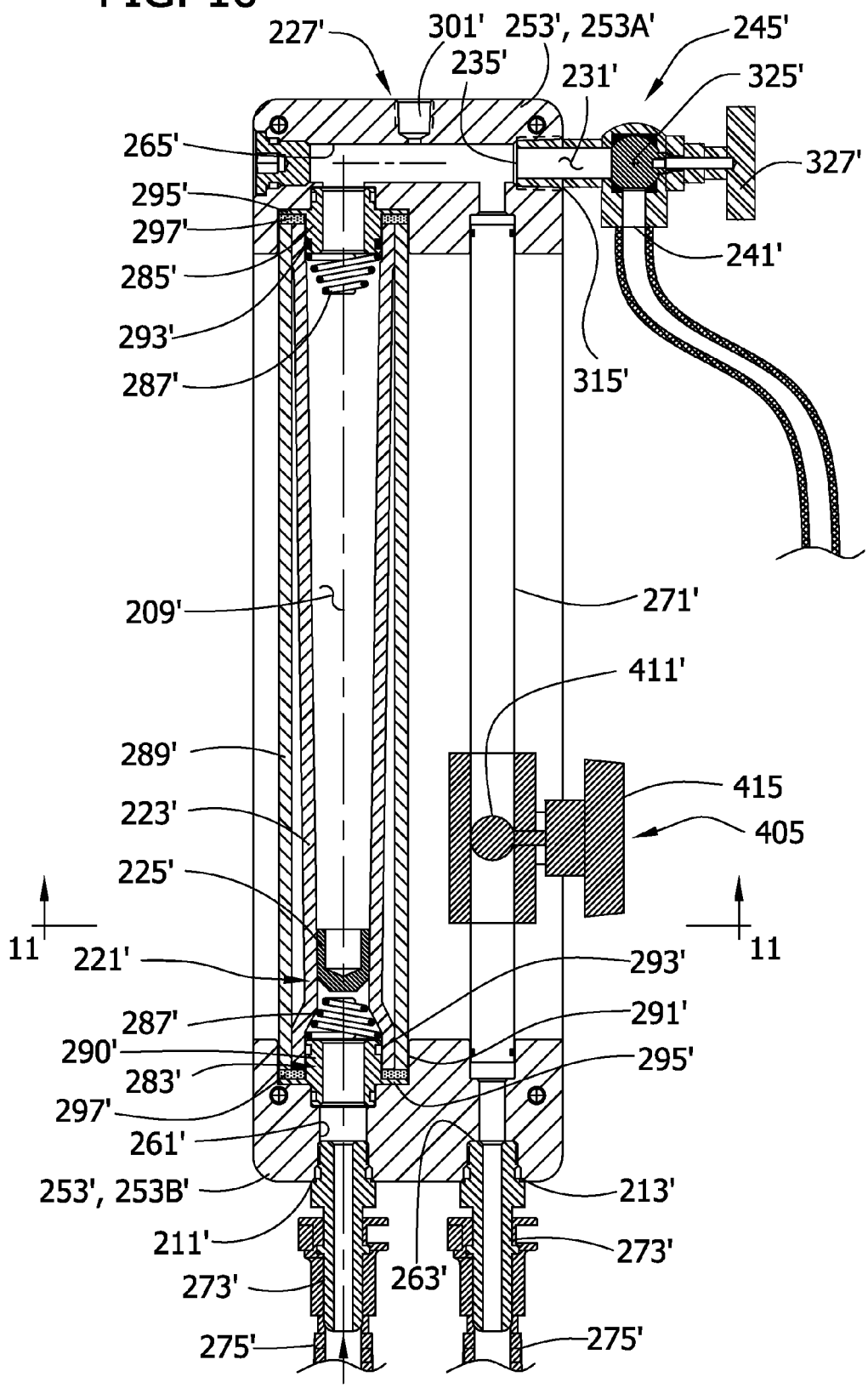
FIG. 10 is a view similar to FIG. 8 but showing the deadhead valve in closed position to conduct a deadhead test.

FIGS. 6-11 show another embodiment of the fuel testing apparatus of this invention, generally indicated at 401. This apparatus is similar to the apparatus 1 of the first embodiment, and corresponding parts are designated by corresponding reference numbers followed by a prime (') designation. However, apparatus 401 includes an additional "deadhead" valve 405 movable between a closed position (FIG. 10) blocking flow through the primary fuel passage 209' and an open position allowing such flow (FIG. 8). In this particular embodiment the deadhead valve 405 is located downstream from the bypass valve 245', but it can be located at other positions along the primary flow path 209'. The deadhead valve 405 comprises a valve member 411 (e.g., a ball member) movable (e.g., rotatable) in the primary flow passage 209' by means of a handle 415 between its open and closed positions. Other types of valve members can be used without departing from the scope of this invention.

The deadhead valve 405 typically remains in its open position except when conducting a "peak pressure" test. In this regard, the maximum pressure output of the fuel pump 17, 107 in either a return or returnless fuel system can be determined by conducting a "peak pressure" test. This test is carried out while the engine is running by moving the bypass valve 245' and the deadhead valve 405 to their closed positions, thus blocking the primary flow passage 209' and bypass flow passage 231' so that there is no output from the testing apparatus 401. After the valves 245', 405 are closed, the fuel pressure upstream of the deadhead valve 405 will rise to the maximum output pressure of the fuel pump, and this "peak pressure" can be read using the pressure gage 227' and compared to the rated capacity of the pump for purposes of evaluating the performance of the pump. The deadhead valve 405 should be closed only briefly (e.g., ten seconds or less) when conducting this test to avoid damage to fuel lines, the fuel pump and/or other components of the fuel system.

The various pressure and flow measurements described above can be used to evaluate both return and returnless fuel systems. By way of example, FIGS. 13 and 13A illustrate an exemplary diagnostic guide identifying potential malfunctions in a return fuel system based on different flow and pressure measurements taken using apparatus 401. Specifically, this particular guide is based on idle pressure, idle flow, peak (i.e., "deadhead") pressure, and peak flow. Similarly, FIGS. 14 and 14A illustrate a diagnostic guide identifying potential malfunctions in a mechanically regulated returnless fuel system based on different flow and pressure measurements taken using apparatus 1 or 401. (A mechanically regulated returnless fuel system is one in which the fuel pump operates continuously, producing an uncontrolled output. Excess fuel is returned to the fuel tank by a return line disposed entirely inside the tank or immediately outside the tank. A pressure regulator inside the tank is used to regulate fuel pressure.) Specifically, the guide of FIGS. 14 and 14A is based on idle pressure, peak flow and peak demand pressure. Further, FIGS. 15 and 15A illustrate an exemplary diagnostic guide identifying potential malfunctions in an electronically regulated returnless fuel system based on different flow and pressure measurements taken using apparatus 401. (An electronically regulated returnless fuel system is one which includes a fuel pump which operates at variable speed, a pressure sensor for sensing fuel pressure in the fuel rail, and an electronic control module which controls the fuel pressure and fuel volume by varying the speed of the fuel pump.) Specifically, the guide of FIGS. 15 and 15A is based on idle pressure, peak demand pressure, peak (i.e., "deadhead") pressure and peak flow. Other diagnostic guides using any combination of flow and pressure values of the type described above (e.g., idle flow, idle pressure, peak flow, peak pressure, peak demand pressure) can be used.

Visual inspection of the condition of the fuel as it flows through the transparent tube 223, 223' can also be used to assist in this diagnosis, if necessary or desired. By way of example, air bubbles in the fuel may indicate a clogged filter or a bad swirl pot or leaking fuel pickup line in the fuel tank allowing air to be sucked into the fuel pump. Fuel contaminated with water, rust or scale may appear discolored or cloudy.

When introducing elements of the present invention or the preferred embodiments(s) thereof, the articles "a", "an", "the" and "said" are intended to mean that there are one or more of the elements. The terms "comprising", "including" and "having" are intended to be inclusive and mean that there may be additional elements other than the listed elements.

In view of the above, it will be seen that the several objects of the invention are achieved and other advantageous results attained.

As various changes could be made in the above constructions, products and methods without departing from the scope of the invention, it is intended that all matter contained in the above description and shown in the accompanying drawing shall be interpreted as illustrative and not in a limiting sense.

What is claimed is:

1. Apparatus for testing fuel flow in a return or returnless fuel injection system comprising a fuel tank, at least one fuel injector for injecting fuel into an internal combustion engine, and a fuel pump for pumping fuel from the fuel tank to the at least one fuel injector, said apparatus comprising a primary flow passage having an inlet adapted for connection to said fuel injection system for receiving fuel pumped by said fuel pump, and an outlet adapted for connection to said fuel injection system for flow of fuel to said at least one fuel injector, a first device for measuring a rate of fuel flow through said primary flow passage, a second device for measuring a fuel pressure in said primary flow passage, a bypass passage downstream from said first device having an inlet adapted to communicate with said primary flow passage and an outlet for delivery of fuel to a fuel receptacle other than said fuel tank, and a bypass valve movable between a first position in which the bypass passage is closed and the primary flow passage is open whereby fuel is adapted to flow to said engine but not to said fuel receptacle and a second position in which the bypass passage is open and the primary flow passage is open whereby fuel is adapted to flow both to said engine and to said fuel receptacle, said bypass valve being movable to said first position for testing fuel flow in a return fuel injection system and to said second position for testing fuel flow in a returnless fuel injection system.

2. Apparatus as set forth in claim 1 wherein said bypass valve is located downstream from said second device.

3. Apparatus as set forth in claim 1 wherein said second device measures fuel pressure in said primary flow passage at a location downstream from said first device.

4. Apparatus as set forth in claim 1 further comprising a deadhead valve in said primary flow passage movable between an open position blocking fuel flow to the engine and an open position allowing fuel flow to the engine.

5. Apparatus as set forth in claim 1 further comprising a diagnostic guide identifying potential malfunctions in said fuel injection system based on flow rate and pressure measurements taken by said first and second devices, respectively.

6. Apparatus as set forth in claim 1 further comprising a housing, said inlet of the primary flow passage and said bypass valve being located adjacent opposite ends of the housing.

7. Apparatus as set forth in claim 6 further comprising a fitting connected to said housing and defining at least a portion of said bypass passage, said fitting mounting said bypass valve, and a valve handle for moving the bypass valve between said first and second positions.

8. Apparatus as set forth in claim 7 wherein said fitting projects laterally from one side of the housing.

9. A method of using apparatus for testing fuel flow in a return or returnless fuel injection system comprising a fuel tank, at least one fuel injector, and a fuel pump for pumping fuel from said fuel tank to said at least one fuel injector, said apparatus comprising a primary flow passage, a first device for measuring a rate of fuel flow through said primary flow passage, a second device for measuring a fuel pressure in said primary flow passage, a bypass passage having an inlet adapted to communicate with said primary flow passage and an outlet for delivery of fuel to a fuel receptacle other than said fuel tank, and a bypass valve movable between a first position in which the bypass passage is closed and the primary flow passage is open whereby fuel is adapted to flow to said engine but not to said fuel receptacle and a second position in which the bypass passage is open and the primary flow passage is open whereby fuel is adapted to flow to said engine and to said fuel receptacle, said method comprising the steps of:

connecting an inlet of the primary flow passage to said return or returnless fuel injection system for receiving fuel pumped by said fuel pump, connecting the outlet of said primary fuel flow passage to said return or returnless fuel injection system for flow of fuel to said at least one fuel injector, selectively moving the bypass valve to said first position in which fuel flows to said at least one fuel injector but not to said fuel receptacle for testing fuel flow in a return fuel injection system or to said second position in which fuel flows to said at least one fuel injector and to said fuel receptacle for testing fuel flow in a returnless fuel injection system.

10. A method as set forth in claim 9 wherein said fuel injection system under test is a return fuel injection system, and wherein said method further comprises starting the engine, using said first device to measure the rate of fuel flow through said primary flow passage when the bypass valve is in said first position, and using said second device to measure the pressure in said primary flow passage when the bypass valve is in said first position.

11. A method as set forth in claim 10 further comprising moving the bypass valve to said second position and then using said first device to measure the rate of fuel flow through the primary flow passage.

12. A method as set forth in claim 10 further comprising selectively closing a deadhead valve to block fuel flow through the primary fuel passage when the bypass valve is in said first position and the engine is running, and then measuring the pressure in the primary flow passage upstream of the closed deadhead valve.

13. A method as set forth in claim 9 wherein said fuel injection system under test is a returnless fuel injection system, and wherein said method further comprises starting the engine and then using said second device to measure the fuel pressure in said primary flow passage when the bypass valve is in said first position.

14. A method as set forth in claim 13 further comprising gradually moving the bypass valve toward said second position and using said first device to measure the rate of fuel flow through the primary flow passage before said bypass valve reaches a fully open position.

15. A method as set forth in claim 13 further comprising selectively closing a deadhead valve to block fuel flow through the primary fuel passage when the bypass valve is in said first position and the engine is running, and then measuring the pressure in the primary flow passage upstream of the closed deadhead valve.

16. A method as set forth in claim 9 further comprising the steps of measuring the rate of fuel flow through said primary flow passage and measuring the pressure of said fuel in said primary flow passage when the bypass valve is in said first position and when said engine is running.

17. A method as set forth in claim 16 further comprising selectively closing a deadhead valve to block fuel flow through the primary fuel passage when the bypass valve is in said first position and the engine is running, and measuring the pressure in the primary flow passage upstream of the deadhead valve when the deadhead valve is closed.

18. Apparatus for testing fuel flow in a return or returnless fuel injection system comprising at least one fuel injector for injecting fuel into an internal combustion engine and a fuel pump for pumping fuel to the at least one fuel injector, said apparatus comprising a primary flow passage having an inlet connected to said fuel injection system for receiving fuel pumped by said fuel pump and an outlet connected to said fuel injection system for flow of fuel to said at least one fuel injector, a first device for measuring a rate of fuel flow through said primary flow passage, a second device for measuring a fuel pressure in said primary flow passage, a bypass passage downstream from said first device having an inlet adapted to communicate with said primary flow passage and an outlet for delivery of fuel to a fuel receptacle, and a bypass valve movable between a first position in which the bypass passage is closed and the primary flow passage is open whereby fuel is adapted to flow to said engine but not to said fuel receptacle and a second position in which the bypass passage is open and the primary flow passage is open whereby fuel is adapted to flow both to said engine and to said fuel receptacle, said bypass valve being movable to said first position for testing fuel flow in a return fuel injection system and to said second position for testing fuel flow in a returnless fuel injection system.

19. Apparatus as set forth in claim 18 wherein the pump is adapted to pump fuel from a fuel tank of the fuel injection system to said at least one fuel injector, and wherein said fuel receptacle is not said fuel tank.

20. Apparatus as set forth in claim 18 wherein said second device measures fuel pressure in said primary flow passage at a location downstream from said first device.

* * * * *